United States Patent
Gherardi et al.

(10) Patent No.: US 8,336,308 B2
(45) Date of Patent: Dec. 25, 2012

(54) LEVER DEVICE FOR OPERATING A HYDRAULIC ACTUATOR, PARTICULARLY FOR MOTORCYCLES

(75) Inventors: Pierangelo Gherardi, Bergamo (IT); Gabriele Verdelli, Milan (IT)

(73) Assignee: Freni Brembo S.p.A., Curno, Bergamo (IT)

(*) Notice: Subject to any disclaimer, the term of this patent is extended or adjusted under 35 U.S.C. 154(b) by 726 days.

(21) Appl. No.: 12/513,704

(22) PCT Filed: Nov. 6, 2006

(86) PCT No.: PCT/IT2006/000769
§ 371 (c)(1), (2), (4) Date: Nov. 6, 2006

(87) PCT Pub. No.: WO2008/056379
PCT Pub. Date: May 15, 2008

(65) Prior Publication Data
US 2010/0043590 A1  Feb. 25, 2010

(51) Int. Cl.
*F15B 7/08* (2006.01)
(52) U.S. Cl. .......................................................... 60/594
(58) Field of Classification Search .................. 60/594
See application file for complete search history.

(56) References Cited

U.S. PATENT DOCUMENTS

| | | | | |
|---|---|---|---|---|
| 5,050,381 A | * | 9/1991 | Matsuno et al. | 60/594 |
| 7,360,632 B2 | * | 4/2008 | Laghi | 60/594 |
| 7,503,237 B2 | * | 3/2009 | Cornolti et al. | 74/525 |
| 7,617,913 B2 | * | 11/2009 | Lumpkin | 60/594 |
| 7,963,114 B2 | * | 6/2011 | Moore | 60/594 |
| 2005/0061590 A1 | | 3/2005 | Lumpkin | |

FOREIGN PATENT DOCUMENTS

| | | |
|---|---|---|
| EP | 0405945 | 1/1991 |
| EP | 1160152 | 12/2001 |
| EP | 1439116 | 7/2004 |
| JP | 62-134390 | 6/1987 |
| JP | 1-218991 | 9/1989 |
| JP | 4-31687 | 2/1992 |
| JP | 6-255565 A | 9/1994 |
| JP | 6339311 | 12/1994 |
| JP | 07 187047 | 7/1995 |
| JP | 09 263281 | 10/1997 |
| JP | 9-263281 A | 10/1997 |
| JP | 4-667742 B | 9/2004 |
| WO | 01/09493 | 12/2001 |
| WO | 02/058988 | 8/2002 |
| WO | 2006/070419 | 7/2006 |

* cited by examiner

*Primary Examiner* — Michael Leslie
(74) *Attorney, Agent, or Firm* — Shoemaker and Mattare (57) ABSTRACT

A lever device for operating a hydraulic actuator for a motorcycle, comprises a support that can be connected to a bearing structure, a hydraulic actuator connected to the support, a main lever, pivotally connected to the support and intended to be operated by being moved close to or away from said hydraulic actuator, a control rod and an adjustment member that are interposed in series between the main lever and a piston of the hydraulic actuator such as to transmit an operating movement from the lever to said piston. The adjustment member pivots about an axis of adjustment and defines a seat that accommodates an end of the control rod. The seat is eccentric to the axis of adjustment, whereby rotation of the adjustment member changes the orientation of the control rod relative to the axis of rotation of the lever, and thus the lever ratio.

12 Claims, 6 Drawing Sheets

LEVER DEVICE FOR OPERATING A HYDRAULIC ACTUATOR, PARTICULARLY FOR MOTORCYCLES

The present invention relates to control lever devices for vehicles, particularly to a lever device for motorcycles in which the lever ratio can be adjusted.

In motorcycles, the brake and clutch are manually actuated by means of a lever device that is mounted on the handlebar of the motorcycle, a hydraulic pipe extending from this lever device to the system to be controlled, such as a brake or a clutch.

The lever of the lever device is usually arranged along the grip of the handlebar and the motorcyclist, in order to actuate the lever, grips the handlebar together with the lever and clenches the hand such as to rotate the lever towards the grip. The movement of the lever produces a thrust force acting on a hydraulic piston, the stroke or position thereof defining the fluid pressure inside said hydraulic pipe for the control of the brake or clutch.

The lever ratio of a lever device for brake or friction is generally defined as the ratio between the manual force application arm and the application arm of the hydraulic fluid resisting force, i.e. the hydraulic piston, relative to the lever fulcrum. This lever ratio is usually set invariable, and in order to arrange different lever ratios for various requirements (e.g. road cycling vs. downhill mountain biking or road motorcycling vs. motocross, track or rain, etc.) the manufacturers of braking systems offer various basic models having different distances between the hydraulic piston and the fulcrum of the brake lever. It is understood that this solution cannot meet the requirements of those who desire to change the lever ratio of the brake without having to replace the entire lever operating device.

In order to meet said requirement for adjusting the lever ratio, solutions have been proposed which provide for the adjustment of the fulcrum position relative to the hydraulic piston or the adjustment of the lever length. These are mechanically complex solutions and result in an inevitable increase in the overall dimensions of the lever device as compared with similar fixed-fulcrum devices.

Accordingly, the object of the present invention is to provide a control lever device, wherein the lever ratio can be easily adjusted and having such characteristics as to overcome the drawbacks cited with reference to the prior art.

This and other objects are achieved by means of a control lever device for a vehicle according to claim 1.

In order to better understand the invention and appreciate the advantages thereof, an embodiment thereof will be described below by way of non-limiting example, with reference to the annexed drawings, in which.

With reference to the figures, with 1 has been generally designated a lever device for operating a hydraulic actuator 3, such as the brake pump of the braking system or hydraulic clutch of a motorcycle. In the example referred to herein, the operating lever is the manual control lever associated to a motorcycle handlebar 4 (only partially indicated with the dotted line in FIG. 1). By acting thereon, the brake pump 3 of the braking system can be operated. Said lever will be referred to herein below as the brake lever 2. The brake lever 2 is known to be placed at the right end of the motorcycle handlebar, in the vicinity of the grip to which the accelerator control is associated.

The lever device 1 comprises a support 5 being provided with means for integral connection to a bearing structure, which in the example is the motorcycle handlebar 4.

Figure 1:
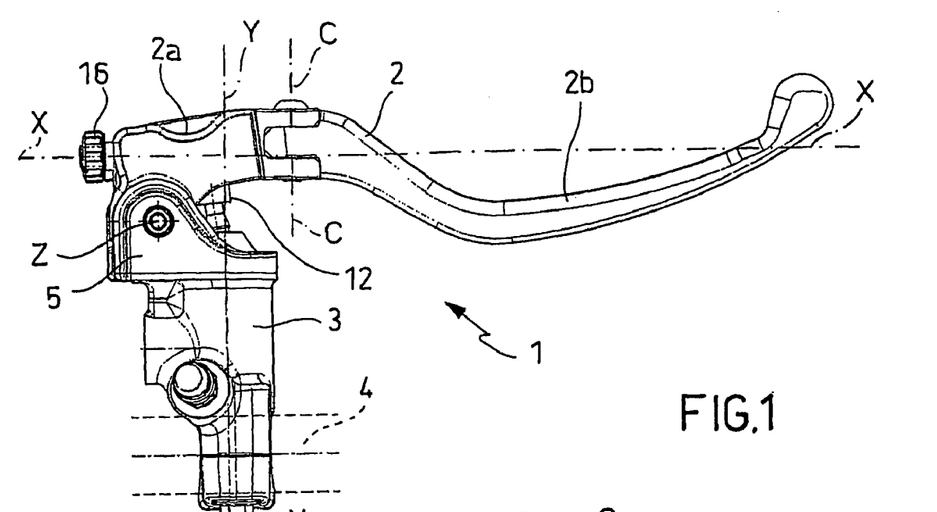
FIG. 1 is a side view of a lever device according to an embodiment of the invention.

The brake lever 2 comprises a head 2a from which a tapered part 2b extends in a main longitudinal direction X-X. The tapered part is intended to be grasped by a user of the motorcycle with the fingers of his/her hands, while his/her palm is rested on the corresponding grip on the handlebar. The tapered part 2b of the brake lever 2 is shaped according to a curved line such as to be ergonomic and facilitate the grip of the same. In the present description, by "longitudinal direction X-X" is intended to mean that direction defined by the straight line passing through the head 2a of the brake lever 2 and interpolating the development of the tapered part 2b (FIG. 1).

In the example in the figure, the head 2a and the tapered part 2b of the brake lever 2 are two distinct parts that are joined to each other by means of a connection screw or pin. The brake lever 2 can, however, be also provided as one piece.

The head 2a of the brake lever 2 is pivotally mounted to the support 5 by means of a pin 6, such as to be angularly movable close to and away from the corresponding grip on the handlebar 4. The pin 6 extends in a direction Z-Z substantially coincident with the normal to the plane passing through the brake lever 2 and handlebar 4 (i.e. normal to the plane of the drawing in FIG. 1).

The brake pump 3 is integral with the support 5, and in the example, is positioned such that a piston 7 contained therein is movable in a crosswise direction Y-Y directed from the handlebar 4 to the brake lever 2, between an end-of-stroke rest position in which the piston 7 is pushed by a counter-spring 8, and a forward operative position to which the piston 7 moves when the brake pump 3 is operated counteracting the action of the counter-spring 8 and the pressure of the brake fluid contained in the body of the brake pump 3. Particularly, when shifting from the rest end-of-stroke position to the forward position, the piston 7 moves in the crosswise direction Y-Y in the sense of moving close to the handlebar 4.

A control rod 10 substantially extending in the crosswise direction Y-Y and projecting from the end facing the brake lever 2 of the body of the brake pump 3 is connected to the piston 7. By acting on the control rod 10 with a preset axial force, the operation of the brake Pump 3 is obtained, i.e. the forward movement of the piston 7 from the rest end-of-stroke position to a forward position.

In an entirely conventional manner, the brake pump 3 is provided with inlet and outlet ports for hydraulic fluid. The rest end-of-stroke position of the piston 7 is adjusted such that, in this position, the piston 7 does not occlude the inlet port for the hydraulic fluid of the brake pump 3.

From what has been discussed above, derives that the movement of the brake lever 2 close to or away from the grip on the handlebar 4 also defines the simultaneous movement of the brake lever 2 close to or away from the brake pump 3, respectively.

In accordance with an embodiment as illustrated in FIGS. 1 to 10, the lever device 1 also comprises a timing lever 9, which is hinged to the support 5 and operatively associated to, preferably pivotally connected to, the brake lever 2 in order to act on the control rod 10 and operate the brake pump 3 while the brake lever 2 is moving close to the brake pump.

Preferably, the timing lever 9 is aligned to the brake lever 2 and is pivoted to the support 5 at the pin 6, such as to move together with the brake lever 2 close to and away from the brake pump 3, and accordingly the grip on the handlebar 4.

Figure 2:
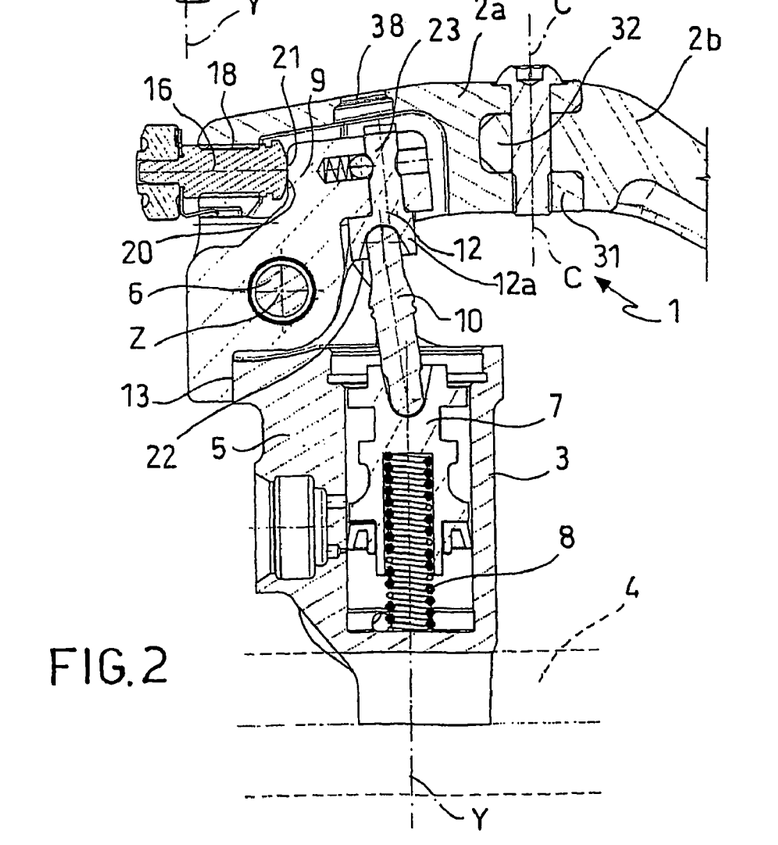
FIG. 2 is a sectional view of the lever device shown in FIG. 1.
Figure 3:
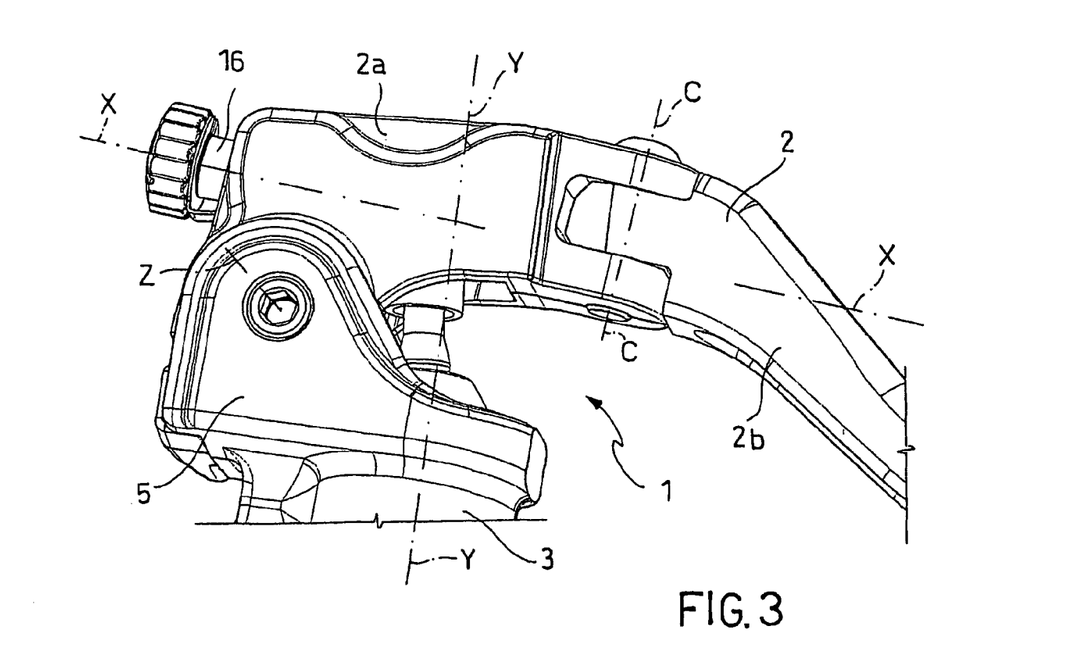
FIG. 3 is a partial perspective side view of the device in FIG. 1.
Figure 4:
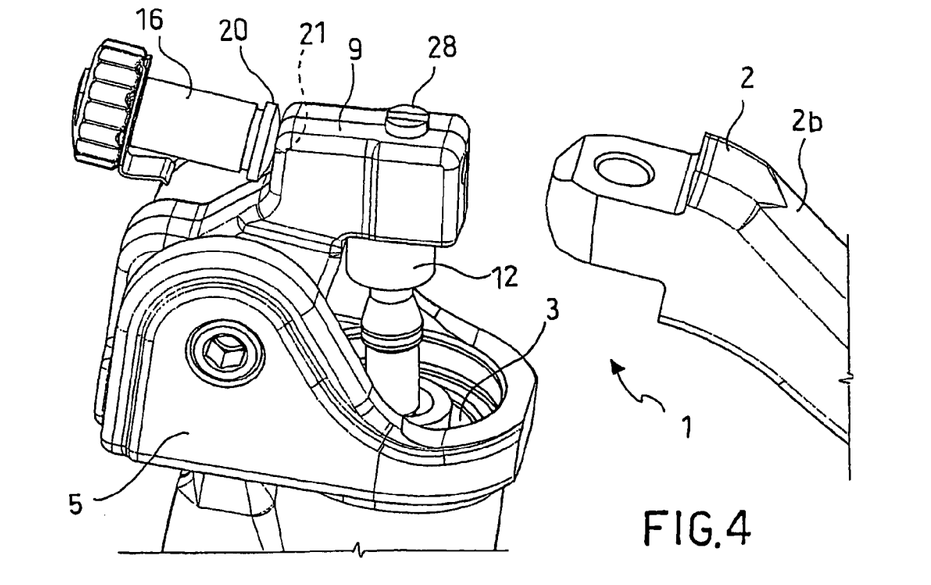
FIG. 4 is the same view as in FIG. 3, in which a part of the device has been omitted.
Figure 5:
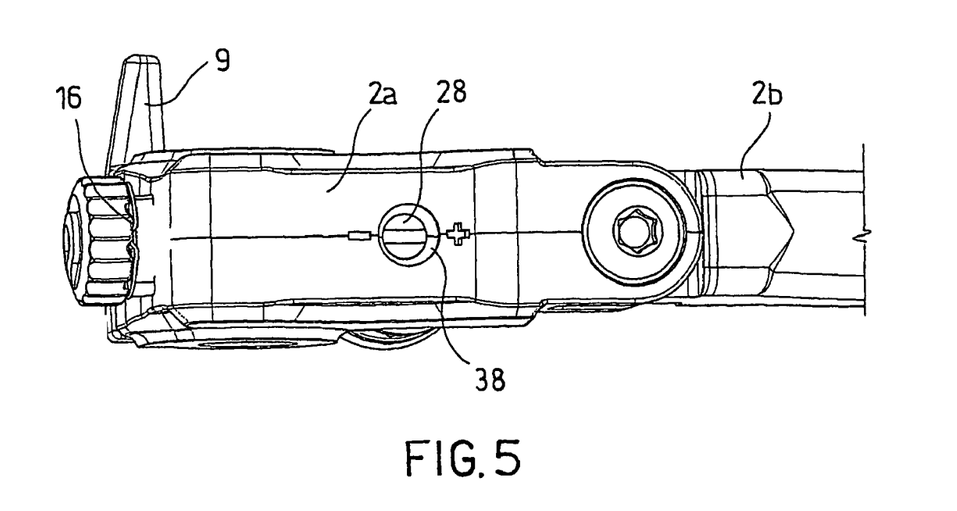
FIG. 5 is a top view of a detail of the device in FIG. 3.
Figure 6:
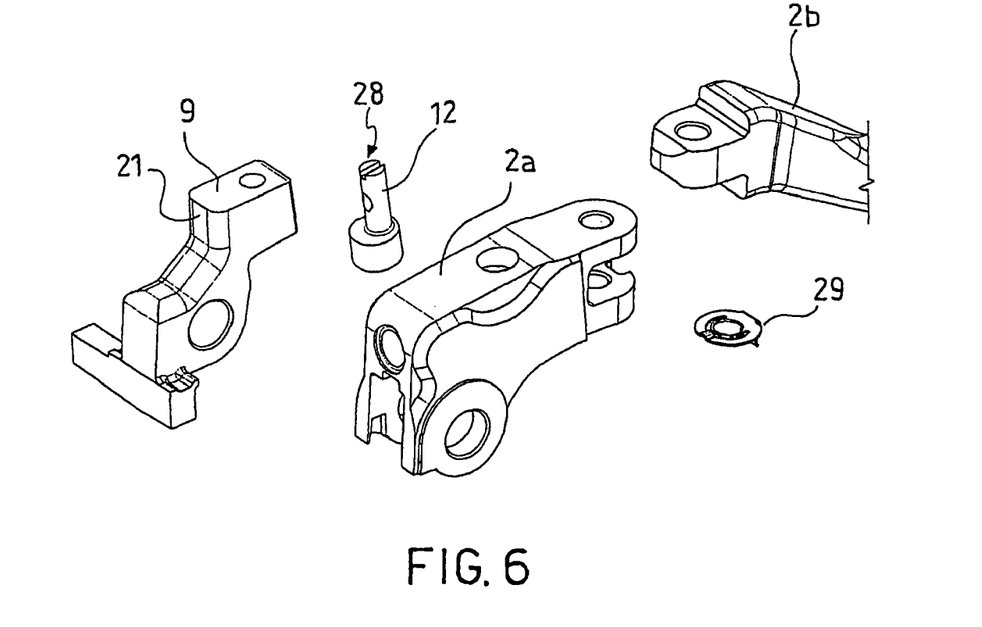
FIG. 6 is a partial exploded view of the device in FIG. 3.
Figure 7:
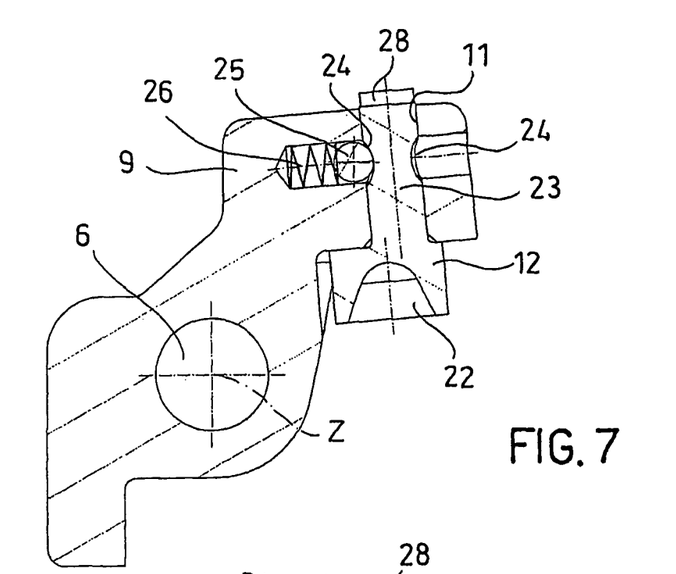
FIG. 7 is a sectional view of a detail of the device in FIG. 1.

The rear portion of the timing lever 9 has an abutment plane 13, which is intended to be a stop for the rotation of the timing lever 9 about the pin 6 in the movement away from the brake pump 3 (counter-clockwise with reference to FIGS. 1 and 2). In fact, when the timing lever 9 is rotated away from the brake pump 3, the abutment plane 13 comes to interfere with the support 5 and abuts against the latter in an end-of-stroke position.

The action applied by the counter spring 8 on the piston 7 of the brake pump 3 causes the control rod 10 to act on the timing lever 9 in the sense that it holds the latter into abutment against the support 5 with a preset elastic load.

The lever device 1 further comprises an adjustment member 12 connected to the timing lever 9 or, when this timing lever is not provided (FIG. 11, 12), directly to the brake lever 2 and having a seat 22 for accommodating the end of the control rod 10 such as to transmit the operating force from the brake lever 2, either directly or indirectly, through the control rod 10 to the piston 7.

According to the invention, the adjustment member 12 is pivoted about an axis of adjustment and the seat 22 is eccentric relative to this axis of adjustment such that the position of the seat 22 in the direction of the perpendicular distance between the seat 22 and the direction of movement Y-Y, of the piston 7 and the perpendicular distance between the seat 22 and the axis of rotation of the brake lever 2 (i.e. the axis defined by the pin 6) can be adjusted by simply rotating of the adjustment member 12. Said variation in the position of the seat 22 causes a variation in the orientation of the control rod 10 relative to the axis of rotation of the brake lever 2, and thus a variation in the lever ratio.

In accordance with a preferred embodiment, the adjustment member 12 comprises a stem 23 which is pivotally accommodated in a through hole 11 that is formed in the timing lever 9 (or alternatively directly in the brake lever 2 when the timing lever is not provided) and a head 12a protruding to the hydraulic actuator 3 and defining said eccentric seat 22 which accommodates the end of the control rod 10. Thereby, the adjustment member 12 and the control rod 10 are interposed in series between the brake lever 2 and the hydraulic piston 7.

Preferably, the stem 23 of the adjustment member has two opposite stop seats 24, i.e. arranged at 180° angular pitch, and suitable to be engaged by a stop dowel 25 that is elastically biased against the stem 23 by a stop spring 26. As may be seen for example in FIG. 7, the stop spring 26 and the stop dowel 25 are preferably accommodated in a suitable seat, such as a blind hole 27 that is formed in the timing lever 9 transversal to the through hole 11. Thereby, the adjustment member 12 can be adjusted in two discrete angular positions, which provide two different lever ratios and are adopted and maintained by means of snap-engagement between the stop dowel 25 and the corresponding stop seat 24 of the stem 23.

In order to facilitate the angular positioning of the adjustment member 12, the end of the stem 23 opposite the head 12a and facing outwards of the lever device 1 is preferably provided with a manual or tool engagement portion, such as a seat 28 to receive the tip of a screwdriver. The end of the stem 23 forming the tool seat 28 projects from the through hole 11 either within or through an opening 38 formed in the brake lever 2, particularly in the head 2a that allows access to the seat 28 from the outside.

In the proximity of the edge of opening 38, a mark is advantageously arranged which indicates one or more, preferably two adjustment positions (e.g. by means of + and − symbols) which act as a reference for the angular positioning of the adjustment member 12.

Figure 8:
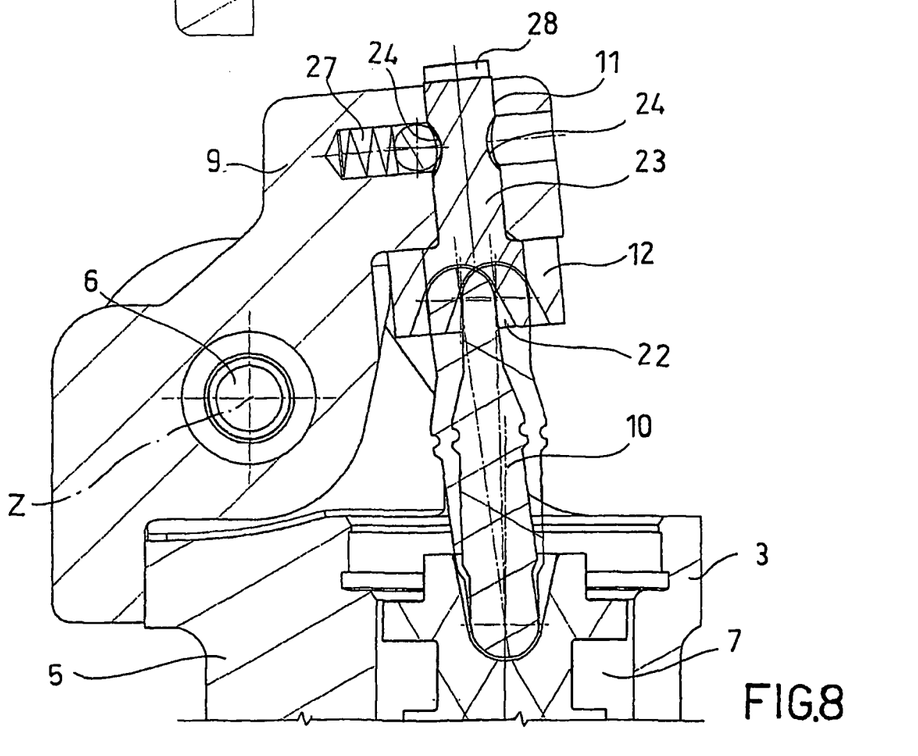
FIG. 8 is a sectional view of a detail of the device in FIG. 1 in two adjustment configurations.

FIG. 8 illustrates how the adjustment of the angular position of the adjustment member and the consequent adjustment of the inclination of the control rod 10 (that works as a truss rod being subjected to an axial compression force) causes a variation in the perpendicular distance between reaction force of the piston applied to the lever 2 and the fulcrum thereof (pin 6), whereas the perpendicular distance between the operating manual force acting on the same lever 2 and the fulcrum thereof (pin 6) is unchanged in order to obtain the adjustment of the lever ratio as desired.

In accordance with an advantageous embodiment, the head 12a of the adjustment member 12 is enlarged relative to the stem 23 thereof, and it is in direct pressing contact with the timing lever 9, or when a timing lever is not provided, with the brake lever 2, such that the adjustment member transmits the operating force from the lever to the control rod 10 substantially only through the head 12a and not also through the stem 23 that is advantageously not subject to axial stress.

In accordance with a further embodiment of the invention, the stem 23 of the adjustment member 12 is threaded and screwed within a corresponding inner threading of the through hole 11. Thereby, when the adjustment member 12 is either tightened or loosened relative to the timing lever 9, and thus changing the distance of the head 12a from the timing lever 9, one obtains an adjustment on the control rod 10 which is moved either close to or away from the brake lever 2, and thus the adjustment of said rest end-of-stroke position of the piston 7 within the brake pump 3. In order to allow the snap engagement between the stop dowel 25 and the corresponding stop seats 24 of the stem 23, despite the further longitudinal adjustment of the adjustment member 12, these stop seats 24 are advantageously provided with an elongated shape in the longitudinal direction of the stem 23.

Preferably, the end of the control rod 10 acting against the adjustment member 12 is rounded, whereas the eccentric seat 23 preferably has a flared semicircular shape and is suitable to accommodate said rounded end in the various adjustment positions and preventing a separation between the seat and the end of the control rod.

The rotation stop of the timing lever 9 and brake lever 2 in their movement close to (clockwise direction with reference to FIGS. 1 and 2) the brake pump 3 is determined by the configuration in which the lever is rested against the handlebar, or when the lever device is dismounted from the handlebar, by the maximum forward operating position allowed for the piston 7 before the latter comes to, abut against the bottom of the body of the brake pump 3 or the counter-spring 8 is pack-compressed.

In accordance with a further embodiment, the lever device 1 is also provided with means 15 for adjusting the position of the brake lever 2 relative to the timing lever 9, i.e. the adjustment of the distance of the tapered part 2b of the brake lever 2 from the corresponding grip of the handlebar 4.

Said means 15 for adjusting the position of the brake lever 2 relative to the timing lever 9 comprise a timing member, preferably a pin 16, which extends for example substantially in said longitudinal direction X-X. The pin 16 engages the brake lever 2 in an axially adjustable manner, in said longitudinal direction X-X in the example, and at the same time, is engaged in abutment against the timing lever 9 such that, a longitudinal displacement of the pin 16 relative to the brake lever 2 corresponds to a change in the position of the brake lever 2 relative to the timing lever 9.

Advantageously, the axially adjustable engagement such as in the longitudinal direction X-X between the pin 16 and the brake lever 2 is provided by the pin 16 having an outer thread that is screw-engaged within a threaded through-hole 18 which is directly formed in the head 2a of the brake lever 2 or in a centering support 14 that is pivoted on said head 2a such as to be capable of rotating about an axis parallel to the axis of rotation of the lever 2 (pin 6).

Consequently, when the pin 16 is rotated relative to the centering support 14 or relative to the head 2a of the brake lever 2, the relative position of the pin 16 can be changed relative to the brake lever 2 in the longitudinal direction X-X, and thus the angular distance between the brake lever 2 and the timing lever 9.

In order to hold the end 20 of the threaded pin 16 into abutment against the timing lever 9, the lever device 1 comprises elastic means 19 biasing the head 2a of the brake lever 2 against the timing lever 9. In the illustrative example as shown in the figures, the elastic means 19 comprise a pair of helical springs 19, each acting between opposite end portions of the brake lever 2 and timing lever 9, in the sense of causing the brake lever 2 to rotate about the pin 6 by moving close to the brake pump 3 (clockwise with reference to FIG. 1), thus recovering any clearance therebetween and preventing said levers from impacting against each other in the presence of vibrations and the like.

Preferably, the end 20 of the threaded pin 16 is circumferentially undulated or knurled and is engaged into abutment within a corresponding circumferentially undulated or knurled recess 21 being formed in the timing lever 9. Due to said knurling or undulation, the adjustment configuration of the adjustment pin 16 is maintained even in the presence of vibrations and impacts against the lever device 1.

Preferably, the pin 16 extends in the longitudinal direction X-X as a substantial extension of the brake lever 2 and more precisely of the tapered part 2b of the latter.

Figure 9:
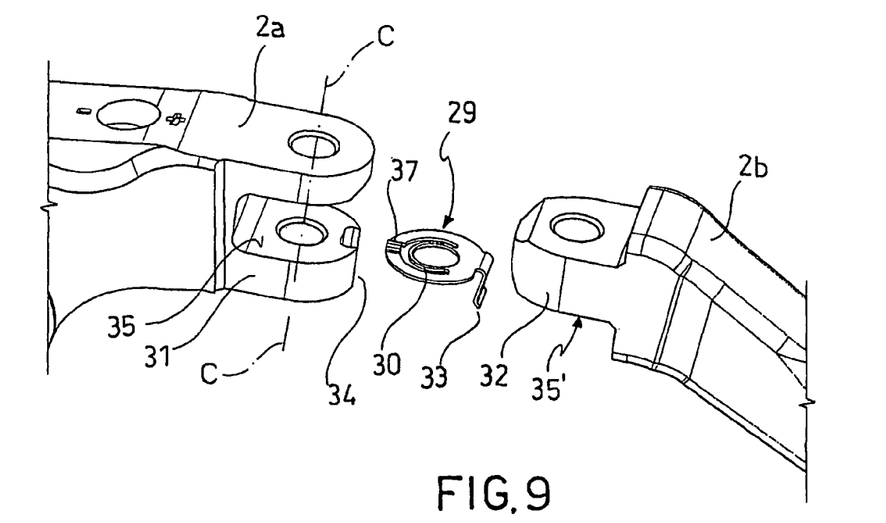
FIG. 9 is an exploded view of a further detail of the device in FIG. 1.
Figure 10:
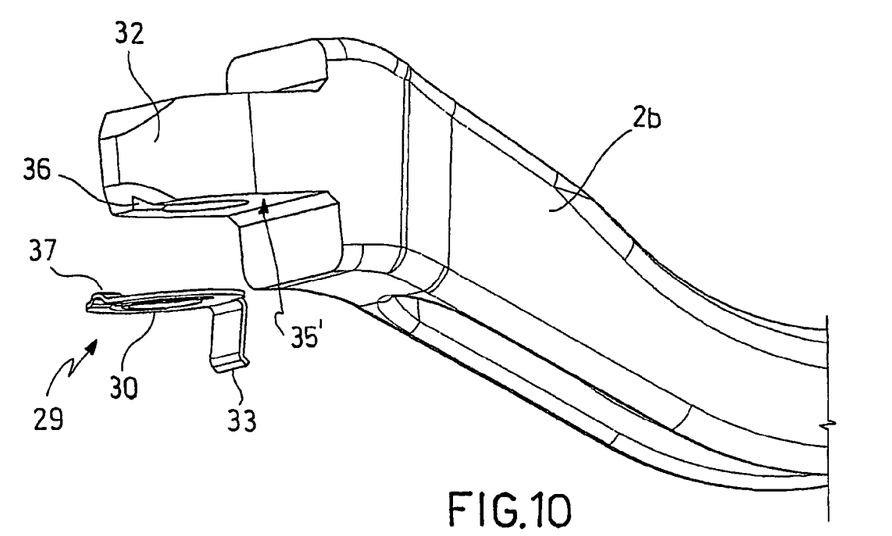
FIG. 10 is an enlarged perspective view of a detail of the device in FIG. 9.

FIGS. 9 and 10 illustrate an advantageous embodiment of the connection between the tapered part 2b and the head 2a of the brake lever 2, which are preferably hinged to each other in a pivotal or, in other words, "collapsible" manner, about a collapse axis C-C transversal to the longitudinal axis X-X of the brake lever 2, by means of a retaining spring 29 being interposed therebetween. The retaining spring 29 comprises a generally plane and annular portion 30 being sandwiched between two opposite sliding surfaces 35, 35' of a hinge portion 31 of the lever head 2a and an adjacent hinge portion 32 of the tapered part 2b of the lever 2 and fitted on a pin (not shown in the figures) which provides the collapse axis C-C. A stop tongue 33 protrudes transversally from the annular portion 30, which engages a suitable seat 34 being formed in a first one of the hinge portions 31, 32 in order to prevent the retaining spring 29 from rotating about the collapse axis C-C. The annular portion 30 comprises a projection, such as an indentation 37 which engages a corresponding seat, such as a notch 36 being formed in the sliding surface 35' of the second one of said hinge portions 31, 32. Preferably, the stop tongue 33 engages a seat 34 that is formed in the hinge portion 31 of the lever head 2a and the indentation 37 engages a notch 36 being formed in the hinge portion 32 of the tapered part 2b of the lever 2. Thereby the elastic engagement between the indentation 34 and the notch 36 provides a mutual elastic snap-positioning between the two portions of the brake lever 2 and also defines the threshold value for the side impact force which causes the lateral collapse of lever 2.

Figure 11:
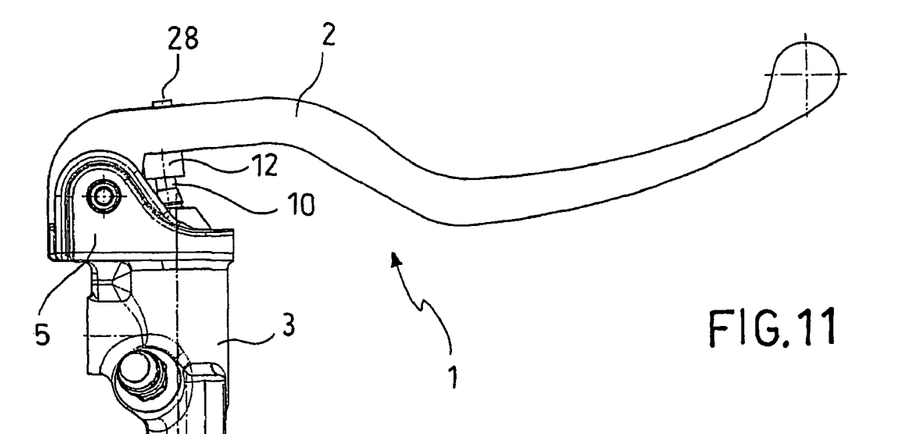
FIG. 11 is a side view of a lever device according to a further embodiment of the invention.
Figure 12:
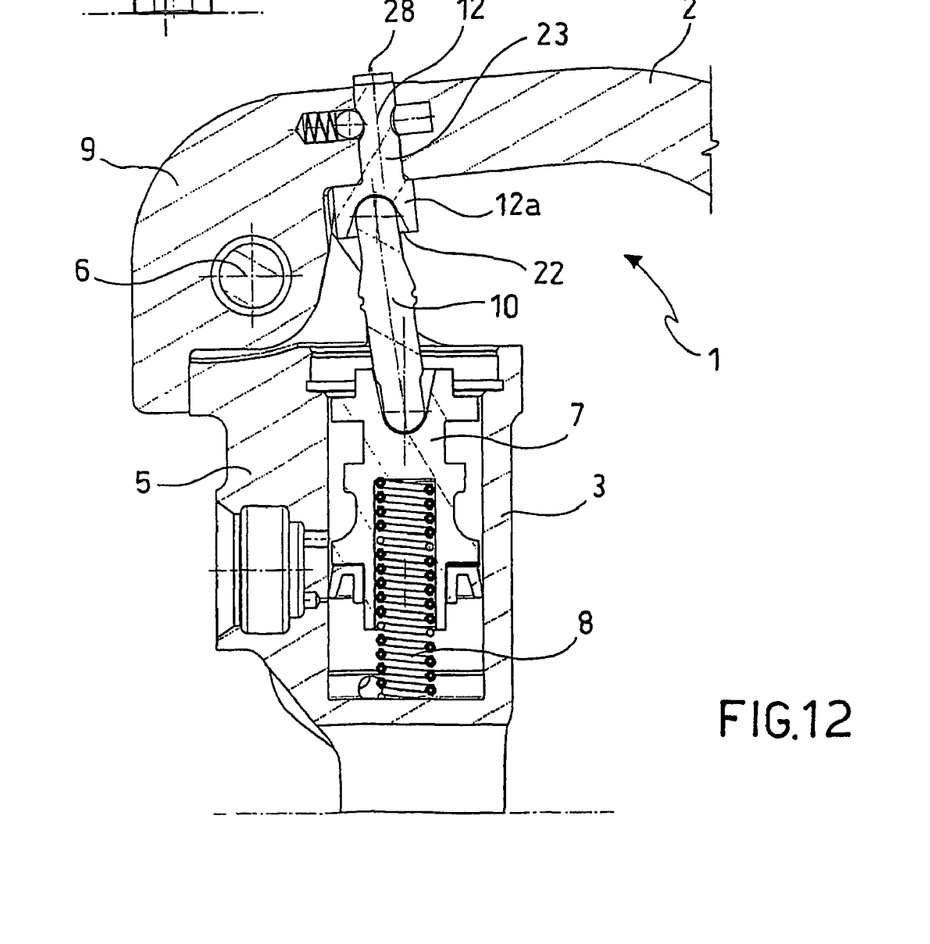
FIG. 12 is a sectional view of the lever device in FIG. 11.

FIGS. 11 and 12 show a further embodiment of the invention, in which the lever device is not provided with a timing lever and the adjustment member 12 is directly arranged between the main lever 2 and the control rod 10 for the hydraulic piston 7 and suitable to adjust the orientation of the control rod 10 relative to the piston 7 and fulcrum (pin 6) of the brake lever 2, as well as (as a function of the optional further function of longitudinal adjustment) the relative position between the brake lever 2 and the piston 7.

The shape and function of the individual parts described above with relation to the first embodiment (FIGS. 1-10) and compatible with the second embodiment (FIG. 11, 12) are preferably substantially unchanged.

The lever device according to the invention has a number of advantages. Particularly, it allows the lever ratio of the device to be easily adjusted by means of a particularly simple and solid mechanism that has reduced overall dimensions as compared with prior art solutions.

The invention claimed is:

1. A lever device for operating a hydraulic actuator for a motorcycle, comprising:
   a support to be connected to a bearing structure,
   a hydraulic actuator connected to the support;
   a main lever pivotally connected to the support and movable toward or away from said hydraulic actuator,
   a control rod and an adjustment member that are interposed in series between the main lever and a piston of said hydraulic actuator such as to transmit an actuating movement by the lever to said piston, wherein said adjustment member is pivotally supported about an axis of adjustment and defines a seat that accommodates an end of the control rod,
   wherein said seat is eccentric relative to said axis of adjustment, such that a rotation of the adjustment member causes the adjustment of the orientation of the control rod relative to the axis of rotation of the lever, and thus the adjustment of the lever ratio.

2. The lever device according to claim 1, comprising a timing lever that is pivotally connected to said support and connected to the main lever, wherein said adjustment member is supported by said timing lever such as to transmit the actuating movement of the lever by means of said timing lever, said adjustment member and said control rod to said piston.

3. The lever device according to claim 1, wherein said adjustment member is arranged such that the rotation of the adjustment member about the axis of adjustment causes an adjustment of the distance of the eccentric seat both from the fulcrum of the lever and from the direction of movement (Y-Y) of the piston.

4. The lever device according to claim 1, wherein the adjustment member comprises a stem that is pivotally accommodated within a hole formed in the lever or in a timing lever and a head protruding to the hydraulic actuator and defining said eccentric seat.

5. The lever device according to claim 4, comprising means suitable to stop said adjustment member in a plurality of discrete adjustment positions.

6. The lever device according to claim 4, wherein said stem comprises two opposite stop seats that are suitable to be engaged by a stop dowel that is elastically biased against the stem by a stop spring.

7. The lever device according to claim 1, wherein an end of the adjustment member opposite the eccentric seat and substantially facing outwards of the lever device forms a manual engagement portion or a seat to receive a tool for allowing the manual adjustment of the lever ratio.

8. The lever device according to claim 1, wherein the adjustment member is threaded and screwed within a corresponding inner threading of a hole, such that it also allows, in addition to the adjustment of the lever ratio, an adjustment of the distance of the eccentric seat from the lever or from a timing lever, and thus an adjustment of the rest end-of-stroke position of the piston.

9. The lever device according to claim 6, wherein the stop seats of the adjustment member have an elongated shape in the longitudinal direction of the stem thereof.

10. The lever device according to claim 1, wherein said eccentric seat has a flared semicircular shape and is suitable to accommodate the end, also semicircular-shaped, of the control rod in the possible adjustment positions in an secure manner.

11. The lever device according to claim 1, wherein said adjustment member comprises a stem and a widened head relative to the stem and being in pressing contact with said lever or timing lever such that the adjustment member transmits the actuating force from the lever to the control rod substantially only via said head.

12. The lever device according to claim 1, comprising a mark indicating one or more reference positions for the angular position of the adjustment member.

* * * * *